United States Patent
Wach

[11] 3,800,610
[45] Apr. 2, 1974

[54] HEAVY DUTY V-BELT
[75] Inventor: Andrew P. Wach, Lincoln, Nebr.
[73] Assignee: The Goodyear Tire & Rubber Company, Akron, Ohio
[22] Filed: Sept. 29, 1972
[21] Appl. No.: 293,684

[52] U.S. Cl............... 74/233, 74/231 R, 74/231 C, 156/137
[51] Int. Cl. ............................................. F16g 5/16
[58] Field of Search ...... 156/137, 138, 139; 74/233, 74/231 P, 231 C, 231 R

[56] References Cited
UNITED STATES PATENTS

| 2,281,148 | 4/1942 | Freedlander | 74/233 |
| 2,189,049 | 2/1940 | Ungar | 74/231 R |
| 2,847,865 | 8/1958 | Rockoff | 74/233 |
| 2,941,413 | 6/1960 | Huber | 74/233 |
| 2,194,833 | 3/1940 | Nassinbene | 74/233 |
| 2,210,073 | 9/1940 | Freedlander | 74/233 |
| 2,392,373 | 1/1946 | Freedlander | 156/137 |
| 2,642,751 | 6/1953 | Freedlander | 74/233 |
| 2,631,463 | 3/1953 | Waugh | 74/233 |
| 2,822,856 | 2/1958 | Waugh | 156/139 |

FOREIGN PATENTS OR APPLICATIONS

| 452,655 | 11/1948 | Canada | 74/233 |

Primary Examiner—Charles J. Myhre
Assistant Examiner—R. H. Lazarus
Attorney, Agent, or Firm—F. W. Brunner; L. A. Germain

[57] ABSTRACT

A heavy-duty V-belt is characterized by envelope construction enclosing a stiff fiber-loaded compression section and molded-in transverse corrugations on the inside surface having a depth at the longitudinal center of the belt greater than the envelope material thickness and tapering into the sides of the belt to a depth at least equal to the envelope thickness.

5 Claims, 3 Drawing Figures

PATENTED APR 2 1974 3,800,610

3,800,610

HEAVY DUTY V-BELT

SUMMARY OF THE INVENTION

This invention relates to heavy duty V-type drive belts commonly used in agricultural combine traction and cylinder drive applications. Because of the harsh environmental operating conditions, the high loads encountered, and the high rate of wear, belts of this type are generally made thicker, having a lower ratio of top width to belt thickness and are usually covered with a heavy corded fabric envelope or jacket. This heavy-duty V-belt design results in a stiff cross-section with potentially high stress planes at the bottom of the compression-section cushion and at the bottom of the envelope, and develop what is referred to in the art as "bottom cracking." Bottom cracking may start at either of these stress planes and with the cord fabric envelope construction the bottom cracking may begin at the bottom of the cushion rather than at the bottom of the envelope. This situation leaves the fabric on the bottom of the belt virtually useless. In the past, for this type of belt and particular application, manufacturers have relied on the toughness of the envelope and cushion material to provide a belt exhibiting good belt life. However, with recent increases in drive acceleration and speed and decreases in running diameters, the belts used in these heavy-duty applications began exhibiting a marked decrease in belt-life due to bottom cracking. Therefore, it is a primary object of this invention to provide a V-type fabric wrapped belt for extremely heavy-duty and aggressive applications with improved flex-fatigue or bottom-cracking characteristics. It is another object of this invention to provide a belt having a reduced stress build-up within the belt resulting in a reduction in hysteresis losses and a subsequent reduction in internal belt temperature. This temperature reduction ultimately results in a belt having increased belt life.

DESCRIPTION OF THE DRAWINGS

The features of the invention will be better understood from a consideration of the following description taken in conjunction with the accompanying drawings in which.

DESCRIPTION OF THE PREFERRED EMBODIMENT

Figure 1:
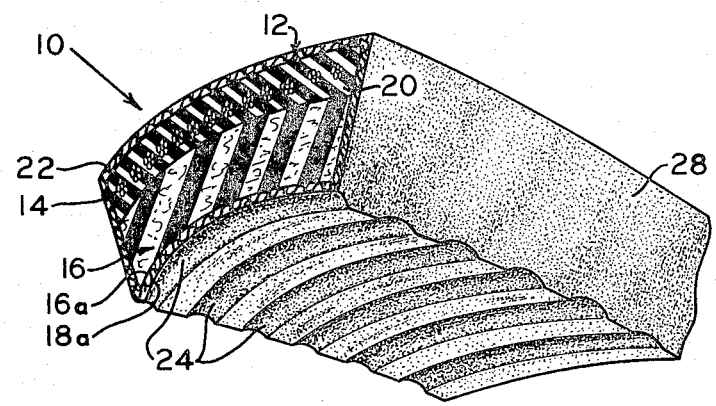
FIG. 1 is a perspective, sectional view of the belt of this invention.

With reference to the drawings, there is illustrated a V-belt construction generally indicated at 10 which comprises tension, neutral axis, and compression sections indicated by 12, 14, and 16, respectively. The neutral axis section 14 is composed of a plurality of longitudinally oriented and substantially inextensible, tightly twisted cords 18 embedded in a tough rubber compound 20. The neutral axis section 14 is bounded on the bottom by the compression section 16 composed of a stiff, fiber-loaded rubber cushion compound to provide transverse stiffness to the belt, and on the top by the tension section 12 composed of a rubber-impregnated fabric envelope 22 to accommodate longitudinal belt flexure. The entire belt structure is wrapped in the heavy rubber-impregnated fabric envelope 22 that is shown as a single ply but may as well be multiple plies and may be composed of either a tire cord fabric or a square woven fabric. The combination of elements just described provides a belt having a very stiff cross section resulting in potentially high stress planes at the bottom of the compression section 16a and at the bottom of the envelope 18a. To break up the stress concentrations, corrugations 24 are incorporated into the bottom of the belt during vulcanization. These corrugations are molded-in transverse to the length of the belt and have a depth 24a at the longitudinal center of the belt 26 greater than the envelope material thickness and taper into the sides of the belt 28 to a depth 24b at least equal to the envelope material thickness. These corrugations break up the straight line stresses developed in the belt by increasing the actual length of the inside surface of the compression section cushion and the envelope. The stress concentrations will now be developed in the corrugations 24 which are dimensionally closer to the belt's neutral axis section 14 and thus are reduced in intensity. As herebefore mentioned, bottom cracking with this heavy-duty construction can and often does start at the bottom of the compression cushion 16a rather than at the bottom of the envelope 18a, leaving the envelope fabric on the bottom of the belt virtually useless, but with the corrugations as described, the envelope fabric is transferred from the bottom of the trapezoidal section of the V-belt to the profile of the corrugations. This transformation places the fabric in the corrugations subject to application flexure stresses and thus relieves the flexure stresses on the adjacent cushion compound. In addition, the placement of the fabric in the corrugations aids in the retardation of flexure cracking in the corrugations.

It should be emphasized that the corrugations herebefore described are not "cogs," "notches," or "teeth," as these terms are used in the art to provide increased belt flexibility. The corrugations of this invention are deeper at the longitudinal center of the belt 26 than at the sides 28 having a preferred range at the center between 10–35 percent of the belt thickness. Tests conducted on this belt indicated that corrugations less than 10 percent of the belt thickness are in the range of the envelope material thickness and have as much effect on "bottom cracking" as a similar belt with no corrugations. In contrast to cogs or teeth that are cut or molded at an equal depth across the belt width, the corrugations of this invention are tapered into the sides of the belt, being of lesser depth 24b at the sides resulting in a substantial increase in sidewall area 28. Since the same stresses that affect the inside surface of the belt also affect the lower half of the sidewall, the stresses are distributed over a larger area with a marked improvement in sidewall degradation.

Figure 2:
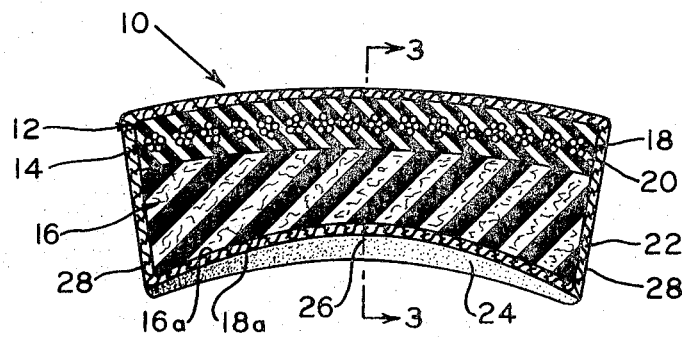
FIG. 2 is a cross-sectional, elevational end view of the belt of FIG. 1.
Figure 3:
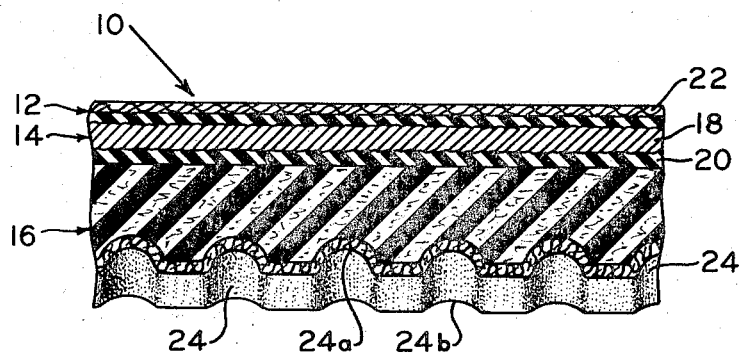
FIG. 3 is a cross-sectional, elevational side view taken on line 3—3 of FIG. 2.

Although the invention may be applied to any type belt, it is particularly shown and described with reference to belts used in heavy-duty applications. With this in mind, it should be noted that the transverse cross-sectional configuration of the belt, as illustrated in FIGS. 1 and 2, is an arched construction under "no-load". Since these belts are used for extremely vigorous applications, they tend to be wider and are built in an arched or arcuate configuration to provide "load-transfer" to the central portion of the belt and limit transverse bending under "load."

While only a single representative embodiment of the invention has been shown in detail and described, it will become apparent to those skilled in the art that various changes and modifications may be made therein without departing from the spirit or scope of the invention as covered by the appended claims.

What is claimed is:

1. An arched transverse section, low-ratio top width to thickness V-type belt exhibiting longitudinal and travsverse stiffness comprising:
   a. a tension section;
   b. a substantially inextensible neutral axis section below the tension section;
   c. a compression section below the neutral axis section; and
   d. a fabric envelope enclosing the tension, neutral axis, and compression sections, said belt having molded therein a plurality of substantially evenly spaced transverse corrugations on the inside surface thereof having a depth at the longitudinal center of the belt greater than the envelope material thickness and tapering into the sides to a depth at least equal to the envelope material thickness said corrugations effectively relieving the flexure stresses at the bottom of the compression section without adding appreciable flexibility to the belt.

2. The belt of claim 1, wherein the corrugations are within the range of 10–35 percent of the total belt thickness.

3. The belt of claim 1, wherein the compression section comprises a fiber-loaded rubber to provide transverse stiffness to the belt.

4. The belt of claim 3, wherein the envelope is a tire cord rubber-impregnated fabric.

5. The belt of claim 3, wherein the envelope is a square-woven, rubber-impregnated fabric.

* * * * *